Dec. 25, 1962 G. KIPER 3,069,989
BETWEEN-THE-LENS SHUTTER ASSEMBLY
Filed June 7, 1960 2 Sheets-Sheet 1

INVENTOR.
GERD KIPER

Dec. 25, 1962    G. KIPER    3,069,989
BETWEEN-THE-LENS SHUTTER ASSEMBLY
Filed June 7, 1960    2 Sheets-Sheet 2

INVENTOR.
GERD KIPER

United States Patent Office 3,069,989
Patented Dec. 25, 1962

3,069,989
BETWEEN-THE-LENS SHUTTER ASSEMBLY
Gerd Kiper, Unterhaching near Munich, Germany, assignor to Agfa Aktiengesellschaft, Leverkusen-Bayerwerke, Germany
Filed June 7, 1960, Ser. No. 34,403
Claims priority, application Germany June 24, 1959
10 Claims. (Cl. 95—63)

The present invention relates to cameras.

More particularly, the present invention relates to shutter assemblies for cameras, and in particular to between-the-lens shutter assemblies.

In certain types of inexpensive cameras there is no structure for holding the shutter in its cocked position and for then releasing the shutter through actuation of a shutter release plunger especially provided for this purpose. Instead, in such cameras when the structure, which is actuated by the operator for the purpose of cocking the shutter, moves beyond a certain point the shutter is simply released and will make the exposure. Cameras of this latter type cannot provide relatively short exposure times and they have a very unfavorable ratio between the diameter of the opening through which the light passes and the diameter of the shutter housing. Such shutters generally include only one or two shutter blades whose mass is so great that it is not possible to provide exposure times shorter than 1/150 sec.

Of course, shutters which have a plurality of relatively light shutter blades operated by a pair of shutter rings can provide short exposure times, which is to say exposure times shorter than 1/150 sec., but the mechanisms which cooperate with these shutter rings are extremely complex and expensive and it has not been possible up to the present time to provide such a shutter construction, which is to say a shutter having a plurality of shutter blades operated by a pair of co-axial shutter rings, in an inexpensive camera of the above type where the shutter is released simply upon movement of the shutter cocking structure beyond a certain point.

It is accordingly a primary object of the present invention to provide a shutter of the type where a plurality of blades are actuated by a pair of shutter rings with such a simple mechanism cooperating with these rings that it becomes possible to provide an exceedingly inexpensive and reliable construction where the shutter is of the type which is simply released upon movement of the manually operable shutter cocking structure beyond a certain point. Thus, it becomes possible with the invention to provide in shutters which are automatically released exposure times far shorter than has heretofore been possible.

It is also an object of the present invention to provide a shutter construction of this type which lends itself with a minimum amount of extremely inexpensive adaptation to use as a shutter of the type which will remain in its cocked position until manually released by the operator.

It is an additional object of the present invention to provide a structure capable of accomplishing the above objects and composed of simple rugged compact elements which are very reliable in operation.

With the above objects in view the present invention includes, in a between-the-lens shutter assembly, a pair of co-axial rotary shutter ring means turnable together from a rest position to a cocked position, while remaining relative to each other in a given angular position where the shutter is closed. A pair of spring means respectively cooperate with this pair of shutter ring means for urging the same to the above rest position. A releasable holding means cooperates automatically with one of these shutter ring means for retaining it, in opposition to that one of the spring means which cooperates therewith, in the cocked position while the other of the shutter ring means is returned by the other spring means toward the rest position for opening the shutter. A release means is carried by this other ring means which first returns to the rest position for rotary movement therewith, and this release means engages, during return of the said other ring means to its rest position, the holding means and moves the latter away from the shutter ring means engaged by the holding means so as to release this latter shutter ring means to be returned by the spring means acting thereon to the rest position so as to close the shutter. An adjustable timing means cooperates with the ring means which returns last to the rest position for retarding the movement of this latter ring means so as to provide a selected exposure time, and a manually operable means cooperates with both of the shutter ring means for moving them from the rest to the cocked position, this manually operable means cooperating only with the first of the shutter ring means to return to its rest position to release this latter ring means for return to the rest position, so as to open the shutter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
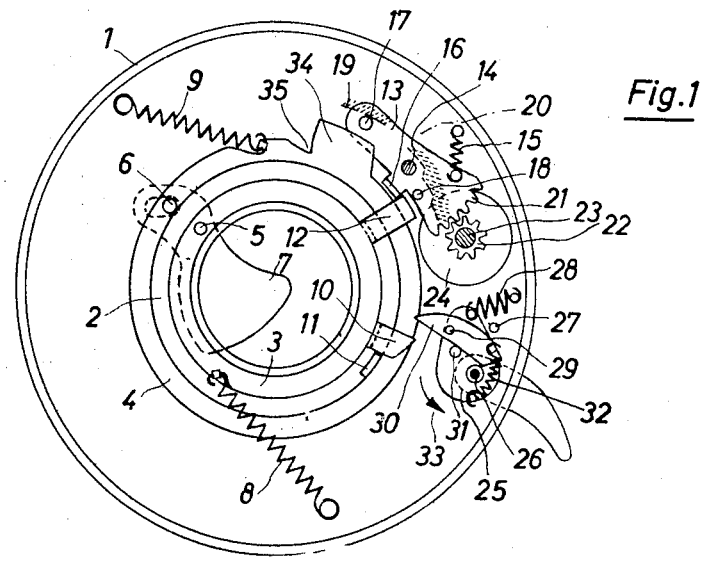
FIG. 1 is a partly schematic illustration, taken in a plane normal to the optical axis, of one possible embodiment of a shutter assembly according to the present invention.

Referring now to FIG. 1, there is illustrated therein a shutter housing 1 which fixedly carries a stationary ring 2 whose axis coincides with the optical axis. An inner shutter ring means 3 is co-axial with the ring 2 and slidably engages the inner surface thereof to be supported and guided thereby for rotary movement about the optical axis, and an outer shutter ring means 4 slidably surrounds the ring 2 to be supported and guided thereby also for rotary movement about the optical axis. The shutter ring means 3 fixedly carries a plurality of pivot pins 5 one of which is shown in the drawing, and the shutter ring means 4 fixedly carries a plurality of pins 6 one of which is shown in the drawing. A plurality of conventional overlapping shutter blades 7, one of which is shown in the drawing, are respectively pivotally supported by the pivot pins 5 of the ring means 3, and these blades are respectively formed with elongated slots through which the pins 6 respectively extend, as shown with the one blade 7 which is illustrated in FIG. 1. Only one blade 7 together with one pin 5 and one pin 6 are shown for the sake of clarity. When the ring means 3 turns relative to the ring means 4 the shutter blades move apart from each other to open the shutter, while when the ring means 4 turns back to its original position with respect to the ring means 3 the several shutter blades return to their closed position, as is well known. The rings 3 and 4 are shown in FIG. 1 in their rest position where the shutter is closed.

A spring means 8 cooperates with the ring means 3 to urge the latter to the rest position, this spring means 8 being in the form of an elongated coil spring one end of which is connected to a stationary pin carried by the housing 1 while the other end is hooked on to a projection of the ring means 3, and in the same way another spring means 9 cooperates with the shutter ring means 4 for urging the latter to the rest position illustrated in FIG. 1. The spring 9 also is in the form of an elongated coil spring one end of which is connected to a stationary pin carried by the housing 1 and the other end of which is hooked on to a projection of the ring 4.

The ring means 3 includes a lug 10 which is fixed to the ring means 3 as by being formed integrally therewith, and this lug 10 extends at least part way across the ring means 4 which is provided with a projection 11 fixed to the ring means 4 as by being formed integrally therewith. As is apparent from FIG. 1 the projection 11 is in the path of clockwise turning of the lug 10, as viewed in FIG. 1, so that when the ring means 3 is turned in a clockwise direction, as viewed in FIG. 1, the ring means 4 will necessarily be carried along with the ring means 3. During turning of the pair of ring means 3 and 4 from their rest position to the cocked position the lug 10 engages the projection 11 so that the pair of ring means 3 and 4 do not change their angular position relative to each other during the cocking of the shutter and thus the shutter remains closed during this time.

The ring means 3 further includes a second lug 12 which extends across and beyond the ring means 4, this lug 12 being fixed to the ring means 3 as by being formed integrally therewith, and this lug 12 is adapted to cooperate in a manner described below with a holding means 13 in the form of a lever which cooperates with the ring means 4 for releasably holding the latter in the cocked position after the ring means 3 is released to the spring 8 to be returned thereby toward the rest position for opening the shutter.

The releasable holding means 13 is in the form of a lever which is turnably supported by a pivot pin 14 which is fixedly carried by the housing 1, and a spring 15 is connected at one end to the lever 13 and at its opposite end to a stationary pin of the housing 1 so as to urge the lever 13 in a counterclockwise direction, as viewed in FIG. 1. This spring 15 urges the lever 13 in the direction where it will engage and hold the ring means 4 to retain the latter in its cocked position. The lever 13 includes a lug 16 which is located in the path of turning movement of the lug 12 of the ring means 3, and in addition the lever 13 fixedly carries a pair of pins 17 and 18. The pin 17 on the one hand engages the stop 19 fixedly carried by the housing 1 to limit the clockwise turning of the lever 13, as viewed in FIG. 1, so that the engagement of the lug 12 with the lug 16 when the lever 13 is in the position of FIG. 1 where the pin 17 engages the stop 19 limits the turning of the ring 3 by the spring 8 and thus determines the rest position of the ring 3, the spring 9 urging the projection 11 of the ring 4 into engagement with the lug 10 so that through this construction the cooperation of the pin 17 and the stop 19 determines the rest position of the pair of shutter rings 3 and 4. On the other hand, the pin 17 forms a projection of the lever 13 which cooperates with the catch portion 34 of the ring 4 in a manner described below for releasably retaining this ring 4 in its cocked position. The pin 18 cooperates with the stepped cam 20 of the adjustable timing means which for the sake of clarity is not further illustrated. This timing means is conventional and when it is adjusted for a particular exposure time a selected step of the cam 20 will be located in the path of turning of the pin 18 so as to determine the extent to which the lever 13 can be turned by the spring 15.

In addition, the lever 13 includes a gear sector 21 formed integrally therewith and meshing with a pinion 22 which is turnably supported by a stationary pin 23 which is fixedly carried by the housing 1, and this pinion 22 is fixed with a fly wheel 24 the mass of which is used to retard the movement of the parts and thus serve to control the exposure time. Thus, it will be seen that with the embodiment of FIG. 1 the holding means 13 also forms part of the timing means.

The structure of the invention also includes a manually operable means which is actuated by the operator for moving the pair of shutter ring means 3 and 4, while they remain in the angular position illustrated in FIG. 1 with respect to each other, from the rest position illustrated in FIG. 1 to a cocked position, and the manually operable means engages a part of the ring means 3 to move both of these ring means from their rest to their cocked position, and this manually operable means simply moves beyond this part of the ring means 3 in order to automatically release the shutter to make the exposure. The part of the ring means 3 which is engaged by the manually operable means is the lug 10. This lug 10 is engaged by a lever 30 of the manually operable means, this lever 30 being pivotally supported by a pivot pin 29 which is fixedly carried by a second lever 25 which is manually turned by the operator about the pivot pin 26 which supports the lever 25 for rotary movement. The pivot pin 26 is fixedly carried by the housing 1, and a portion of the rotary member 25 extends to the exterior of the housing 1 so as to be accessible to the operator who can thus turn the rotary member of lever 25. A spring 28 is fixed at one end to a stationary pin of the housing 1 and at its opposite end to a projection of the lever 25 to urge the latter in a clockwise direction, as viewed in FIG. 1, about the pin 26 to the illustrated rest position where the lever 25 engages the stationary pin 27 which is fixedly carried by the housing 1. A spring 32 is connected at one end to a pin which is carried by the lever 25 and its opposite end to a pin which is carried by the lever 30 for urging this lever 30 to turn in a clockwise direction around the pin 29 which is carried by the lever 25, and a stop pin 31 is fixedly carried by the lever 25 to limit the turning of the lever 30 by the spring 32.

When an exposure is to be made the operator turns the member 25 in the direction of the arrow 33. The lug 10 is located in the path of turning movement of the lever 30 so that the latter engages the lug 10 and thus turns the lug 10 together with the pair of rings 3 and 4 from their rest toward their cocked position, the lug 10 engaging the projection 11 so as to turn both of the rings without changing their angular position relative to each other, so that the shutter remains closed at this time. Of course both of the springs 8 and 9 are being tensioned to an increasing degree at this time. At the beginning of the turning of the pair of ring means 3 and 4 toward the cocked position the spring 15 turns the lever 13 in a counterclockwise direction, as viewed in FIG. 1, so that the lug 16 follows the lug 12. The extent to which the lever 13 can be turned by the spring 15 is limited by engagement of the pin 17 with the outer periphery of the catch portion 34 of the ring 4. Just before the rings reach their cocked position the left end of the outer peripheral edge of the catch portion 34, as viewed in FIG. 1, moves to the right, as viewed in FIG. 1, beyond the pin 17 so that the latter is now free to enter into the notch 35 and to cooperate with the left edge of the catch portion 34 to retain the ring 4 in opposition to the spring 9 in the cocked position. The extent to which the lever 13 can turn so as to move the pin 17 into the notch 35 is determined by the particular exposure time which is set into the camera, a particular step of the cam 20 being located opposite the pin 18 in accordance with the setting of the exposure time. Thus, if the cam 20 is in the position shown in FIG. 1 the lever 13 will be able to turn through a relatively short distance while if the cam 20 is advanced to the right, as viewed in FIG. 1, the pin 18 will turn through a considerably greater angle before it engages the step of the cam 20, and thus the pin 17 at this time will be able to enter to a greater degree into the notch 35.

The pair of rings 3 and 4 are in their cocked position at the instant when the tip of the lever 30 slides away from the lug 10. The exposure brought about by the opening of the shutter takes place immediately in a fully automatic manner at this time. Since the ring means 4 is retained by the releasable holding means 13, 17 in the cocked position, the other shutter ring means 3 is turned by the spring means 8 toward the rest position so that there is now the relative movement between the rings 3 and 4 which will turn the blades 7 in order to open the shutter. When the shutter is fully open the lug 12 of the ring means 3 engages the lug 16 of the lever 13 to turn the latter in opposition to the spring 15 in a clockwise direction, as viewed in FIG. 1, and, as was pointed out above, at the same time the mass 24 is turned so that the spring 15 and the mass 24 serve to retard the turning of the lever 13 so as to provide the desired exposure time. Of course, the angle through which the lever 13 will be turned will be determined by the particular step of the cam 20 which is engaged by the pin 18, so that in this way the exposure time can be selectively adjusted. As soon as the lever 13 has been turned through an angle sufficient to locate the pin 17 beyond the left edge of the catch portion 34, as viewed in FIG. 1, the ring 4 is released to the spring 9 which immediately returns the ring 4 to its rest position where the lug 10 is engaged by the projection 11 of the ring 4, and thus the shutter is again closed. Of course, after moving beyond the catch portion 34 of the ring 4, the pin 17 and the lever 13 continue to turn through a slight distance until the pin 17 engages the stop 19 so as to determine the rest position of the shutter in the manner described above.

The above operations take place very quickly, and when the operator releases the manually operable means to be returned by the spring 28 to its starting position, the parts will have already been returned to the position illustrated in FIG. 1, with the exception of the manually operable means. During the return of the manually operable means to its rest position the lever 30 will again engage the lug 10 but at this time the lever 30 is turning with the lever 25 in a clockwise direction, as viewed in FIG. 1, so that the lever 30 simply rides over the lug 10 without moving the latter. The spring 32 enables the lever 30 to turn with respect to the lever 25 so that it can move past the lug 10, and as soon as the lever 30 moves beyond the lug 10 the spring 32 returns the lever 30 to the position shown in FIG. 1 where it engages the stop 31. Of course, the spring 28 returns the lever 25 to the position where it engages the stop 27.

Figure 2:
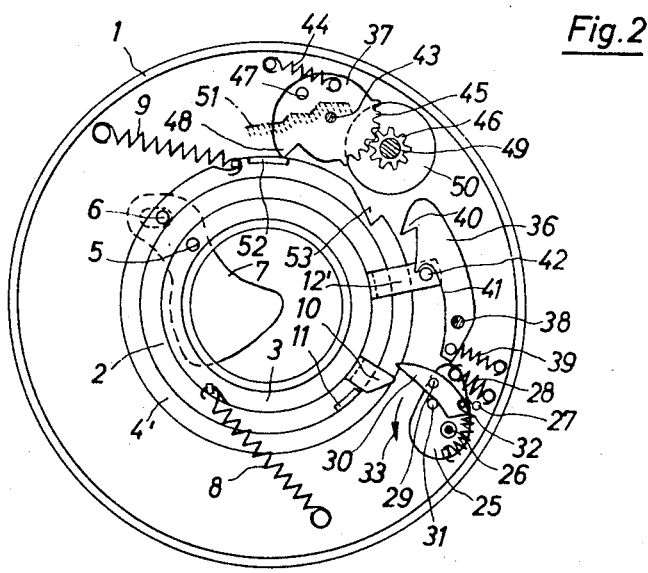
FIG. 2 is a partly diagrammatic illustration, taken in a plane normal to the optical axis, of a second embodiment of a shutter assembly according to the present invention.

In the embodiment of the invention which is illustrated in FIG. 2 the releasable holding means does not form part of the timing means. The timing means is entirely independent of the releasable holding means, and in addition the spring 9 acts through the ring means 4' on the timing means in the embodiment of FIG. 2, whereas in the embodiment of FIG. 1 the ring means 3 acted through the lug 12 on the lever 13 to actuate the timing means.

Referring to FIG. 2 it will be seen that the housing 1 and the ring 2 which supports the pair of ring means 3 and 4' are identical with that of FIG. 1, and the ring means 3 also is identical with the exception of its lug 12' which has a somewhat different construction from the lug 12. The ring means 4' is also identical with that of FIG. 1 except that it includes a projection 52 for a purpose described below as well as a notch 53 which provides the ring means 4' with a catch portion to cooperate with the projection 40 of the releasable holding means 36 of the embodiment of FIG. 2. This releasable holding means 36 is in the form of a lever which is pivotatle supported by a stationary pin 38 carried by the housing 1, and a spring 39 is connected at one end to a stationary pin of the housing 1 and at its opposite end to a pin which is carried by the lever 36 to urge the latter to turn in a counterclockwise direction, as viewed in FIG. 2, about the pivot pin 38. The holding lever 36 is formed with an elongated curved edge portion 41 which is adapted to cooperate with a pin 42 which is fixed to and projects from the lug 12'. The manually operable means of the embodiment of FIG. 2 is identical with that of FIG. 1.

The timing means of the embodiment of FIG. 2 includes a rotary member 37 which is supported for turning movement by a stationary pin 43 which is fixedly carried by the housing 1. A spring 44 is connected at one end to a stationary pin of the housing 1 and at its opposite end to a pin carried by the rotary member 37 so as to urge the latter to turn in a counterclockwise direction, as viewed in FIG. 2, about the pin 43. The rotary member 37 has formed integrally therewith a gear sector 45 which meshes with a pinion 46 rotatably supported by a stationary pin 49 carried by the housing 1, and this pinion 46 is fixed with a flywheel 50 which again forms the mass which is used to control the rate with which the parts of the timing mechanism move. The rotary member 37 carries a pin 47 which is adapted to cooperate with a selected one of the steps of a stepped cam 51 of the adjustable timing structure, the remainder of the timing means being omitted from FIG. 2 for the sake of clarity. As is well-known the cam 51 is shifted in accordance with the selected exposure time so as to locate in the path of turning of the pin 47 a selected step of the cam 51, and in this way the extent to which the rotary member 37 must be turned can be selectively controlled so as to selectively set the exposure time. The rotary member 37 is provided with a projection 48 which cooperates with the projection 52 of the ring means 4 in a mannner described below.

When the manually operable means of the embodiment of FIG. 2 is actuated by being turned in the direction of the arrow 33, the lever 30 will cooperate with the lug 10 in the manner described above to turn both of the ring means 3 and 4' from their rest to their cocked position. During this turning the pin 42 will move away from the edge 41 of the releasable holding lever 36 so that the projection 40 thereof will enter into the notch 53 to engage with the catch portion of the ring means 4' so as to prevent the latter from being returned to the rest position by the spring 9, the spring 39 acting to turn the lever 36 in a counterclockwise direction, as viewed in FIG. 2, for urging the projection 40 into the notch 53. At the same time, the projection 52 will turn in a clockwise direction, as viewed in FIG. 2, together with the ring means 4' through an angular distance sufficient to permit the projection 48 to engage the left edge of the projection 52, as viewed in FIG. 2, and the extent to which the spring 44 will turn the rotary member 37 at this time will be determined by the particular step of the cam 51 which has been selectively placed in the path of turning movement of the pin 47.

Thus, just before the rings 3 and 4' have reached their cocked position the projection 40 will have entered the notch 53 and the projection 48 will have turned into engagement with the left edge of the projection 52, as viewed in FIG. 2. The parts are cocked at the instant when the tip of the lever 30 moves away from the lug 10, as was described above. As soon as the lever 30 moves beyond the lug 10 the spring 8 will return the ring means 3 toward its rest position, and during this turning the projection 42 of the lug 12' will engage the edge 41 of the releasable holding lever 36 to turn the latter in opposition to the spring 39 in a clockwise direction about the pivot 38, as viewed in FIG. 2, so as to move the projection 40 out of the notch 53 and thus release the ring means 4, to the spring 9. Now the spring 9 will act through the projection 52 on the projection 48 to turn the rotary member 37 in a clockwise direction, as viewed in FIG. 2, in opposition to the spring 44, and the force of the spring 44 as well as the mass 50 will regulate the movement of the timing mechanism so as to provide the selected exposure time. Of course, while the ring 4' is retained by the lever 36 in the cocked position and the ring 3 is returning to the rest position the shutter is opened, and upon movement of the lever 36 away from the ring 4' the shutter is fully open and the selected exposure time starts in response to the urging of the projection 52 against the projection 48 to return the parts to their rest position shown in FIG. 2. When the tip of the projection 48 reaches the left edge of the projection 52 as viewed in FIG. 2, the shutter will be fully closed and the film will have been exposed for the selected exposure time, and now the spring 9 will quickly return the ring 4' to the position illustrated in FIG. 2. This turning is limited in the same way as in the embodiment of FIG. 1 by engagement of the projection 11 with the lug 10. In the embodiment of FIG. 2 the curved edge 41 is provided at its end with a substantially hook-shaped portion which engages the pin 42, as illustrated in FIG. 2, so as to determine the rest position of the parts. When operator releases the manually operable means used to initiate the exposure the lever 30 rises over the lug 10 and the spring 28 returns the manually operable means to its rest position shown in FIG. 2, in exactly the same way as was described above in connection with FIG. 1.

As was pointed out above, the structure of the type shown in FIGS. 1 and 2 enables much shorter exposure times to be obtained with shutter assemblies where the release of the shutter takes places fully automatically after the cocking thereof. However, in order to obtain even shorter exposure times it would be necessary to increase the force of the springs 8 and 9 to such an extent that the fully automatic release of the shutter would not be satisfactory, and thus in order to obtain even shorter exposure times the structure of the invention can easily be converted to that type of operation where the shutter is maintained in its cocked position until released by manual operation of a suitable shutter release structure. Such a construction is shown in FIG. 3.

Figure 3:
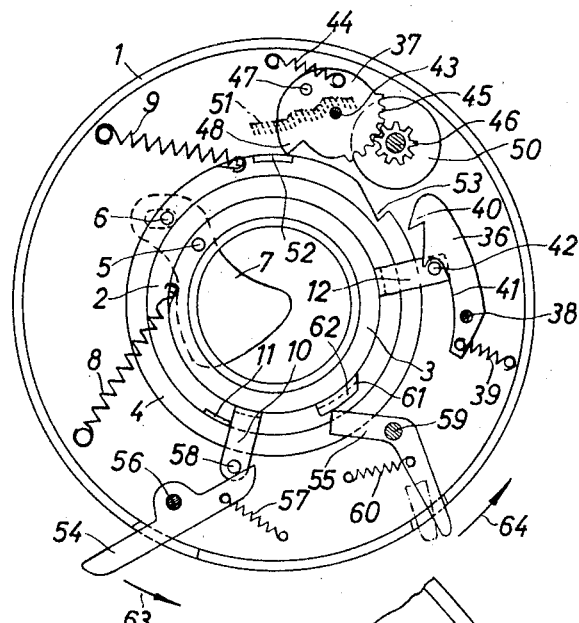
FIG. 3 is an illustration, in a plane normal to the optical axis, of still another embodiment of a shutter assembly according to the present invention.

With the exception of the manually operable means, the structure of FIG. 3 is identical with that of FIG. 2. The lug 10' of the shutter ring means 3 is extended in the embodiment of FIG. 3 and fixedly carries a pin 58 which cooperates with a cocking lever 54 which extends through a suitable slot in the shutter housing 1 to the exterior so as to be accessible to the operator for turning in the direction of the arrow 63. The cocking lever 54 is supported for turning movement by a stationary pin 56 which is carried by the housing 1. The spring 57 is connected at one end to a pin carried by the lever 54 and at its opposite end to a stationary pin of the housing 1 to urge the lever 54 to turn in a clockwise direction where it will engage one end of the slot through which the lever 54 extends, and as was pointed out above the inner end of the lever 54 is adapted to engage the pin 58 fixed to the lug 10'. The ring 3 additionally carries a projection 62 whose right end 61, as viewed in FIG. 3, is adapted to cooperate with an end of a bell-crank 55 supported for turning movement by a stationary pin 59 carried by the housing 1, and this bell-crank 55 forms the shutter release and has a free end extending through another slot of the housing 1 to the exterior thereof so as to be accessible to the operator. A spring 60 is connected at one end to a pin which is carried by the lever 55 and at its other end to a stationary pin of the housing 1 to urge the lever 55 to turn in a clockwise direction, as viewed in FIG. 3, and when it is desired to release the shutter the operator turns the release lever 55 in the direction of the arrow 64. Thus, with the embodiment of FIG. 3, the cocking lever 54 and the release lever 55 replace the manually operable means of FIGS. 1 and 2 in order to form the manually operable means of FIG. 3.

In order to cock the shutter of FIG. 3 the lever 54 is turned in the direction of the arrow 63 so that the lever 54 engages the pin 58 and turns the lug 10 together with the projection 11 and of course the rings 3 and 4' in a clockwise direction as viewed in FIG. 3, in order to move the parts to the cocked position where the projection 40 of the lever 36 enters the notch 53 to engage the catch portion of the ring 4' and where the projection 48 of the rotary member 37 engages behind the projection 52 of the ring 4'. Just before the parts reach their cocked position the lever 55 is moved by the spring 60 behind the end 61 of the projection 62, and now the lever 55 cooperates with the end 61 of the projection 62 to retain the rings 3 and 4' in their cocked position. When it is desired to make an exposure the operator simply turns the lever 55 in the direction of the arrow 64 in opposition to the spring 60 so that the ring 3 is released, and of course the lever 36 will prevent return of the ring 4' to its rest position at this time, so that the ring 3 turns in the manner described above with respect to the ring 4' in order to open the shutter, and then the several operations take place in the manner described above with respect to FIG. 2.

Figure 4:
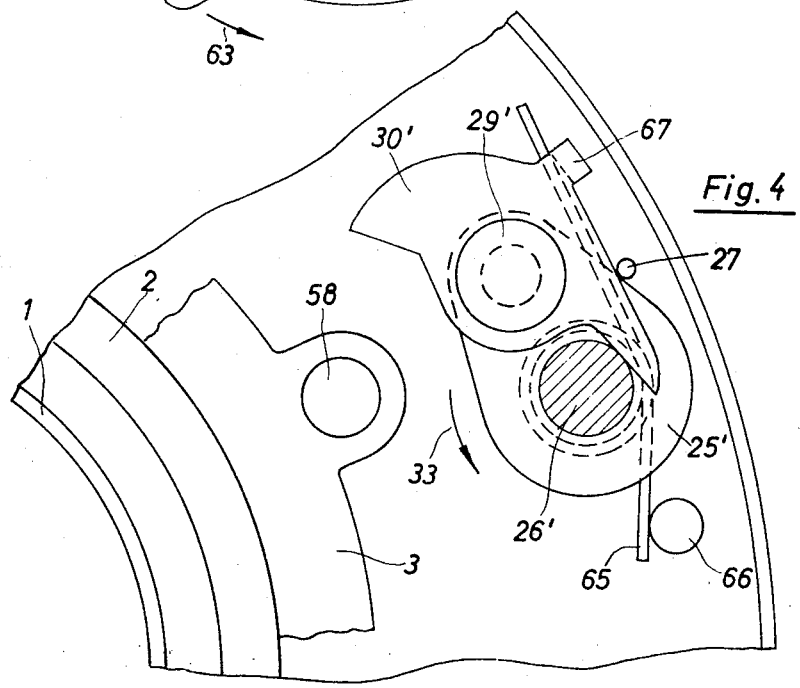
FIG. 4 is a fragmentary illustration of another embodiment of a manually operable means according to the present invention.

FIG. 4 illustrates another, simplified embodiment of a manually operable means which can be used instead of the manually operable means of FIGS. 1 and 2. Thus, referring to FIG. 4 it will be seen that instead of a pair of springs such as the spring 28 and 32, a single spring 65 is used. This spring 65 is coiled around the pivot pin 26' which supports the rotary member or lever 25' for turning movement, and the spring 65 has one end portion engaging a stationary pin 66 and another end portion engaging a lug 67 which extends integrally from the lever 30' which corresponds to the lever 30 and operates in the same way. The pivot pin 29' which supports the lever 30' for turning on the lever 25' also is shown in FIG. 4. With this arrangement the single spring 65 turns the lever 30' to the position where one end engages the pivot pin 26' which thus serves the function of the pin 31 of the embodiments of FIGS. 1 and 2, and the spring 65 turns the entire assembly until the lug 67 engages the outer wall of the housing 1. As is evident from FIG. 4 the spring 65 enables the lever 30' to yield during the return of the lever 25' to its rest position.

It is apparent from the above description of some possible embodiments of structure in accordance with the present invention that on the one hand without providing a complex and expensive structure nevertheless the invention succeeds in greatly reducing the possible exposure times with structures where the exposure takes place automatically upon cocking of the shutter. The use of a number of blades 7 instead of an exceedingly small number of heavier blades as is conventional in shutters of this type does not appreciably increase the cost and at the same time does permit the exposure time to be reduced substantially. Moreover, it is apparent that the simple, compact assembly can provide even shorter exposure times by being easily converted to the type of structure illustrated in FIG. 3 where the shutter will remain cocked until manually released.

It will be understood from each of the elements described above, or two or more together, may also find a useful application in other types of cameras differing from the types described above.

While the invention has been illustrated and described as embodied in shutters, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a between-the-lens shutter assembly, in combination, a pair of co-axial rotary shutter ring means turnable together from a rest position to a cocked position while remaining relative to each other in a given angular position where the shutter is close; a pair of spring means respectively cooperating with said pair of shutter ring means for urging the same to said rest position; releasable holding means cooperating automatically with one of said shutter ring means for retaining said one shutter ring means, in opposition to that one of said spring means, means which cooperates with said one shutter ring means, in said cocked position while the other of said shutter ring means is returned by the other spring means toward rest position for opening the shutter; release means carried by said other shutter ring means for turning movement therewith, said release means engaging, during return of said other ring means to said rest position, said holding means and moving the latter away from said one shutter ring means for releasing the latter to said one spring means to be returned thereby to said rest position to close the shutter; adjustable timing means cooperating with said one shutter rings means for retarding the movement thereof by said one spring to said rest position, so as to provide a selected exposure time; and manually operable means cooperating with both of said shutter ring means for moving the same from said rest to said cocked position, said manually operable means cooperating with said other ring means to release the latter for return to said rest position, so as to open the shutter.

2. In a between-the-lens shutter assembly, in combination, a pair of co-axial rotary shutter ring means turnable together from a rest position to a cocked position while remaining relative to each other in a given angular position where the shutter is closed; a pair of spring means respectively cooperating with said pair of shutter ring means for urging the same to said rest position; releasable holding means cooperating automatically with one of said shutter ring means for retaining said one shutter ring means, in opposition to that one of said spring means which cooperates with said one shutter ring means, in said cocked position while the other of said shutter ring means is returned by the other spring means toward said rest position for opening the shutter; release means carried by said other shutter ring means for turning movement therewith, said release means engaging, during return of said other ring means to said rest position, said holding means and moving the latter away from said one shutter ring means for releasing the latter to said one spring means to be returned thereby to said rest position to close the shutter; adjustable timing means cooperating with said one shutter ring means for retarding the movement thereof by said one spring means to said rest position, so as to provide a selected exposure time, said other shutter ring means having a portion which engages and actuates said timing means during return of said other shutter ring means to said rest position; and manually operable means cooperating with both of said shutter ring means for moving the same from said rest to said cocked position, said manually operable means cooperating with said other ring means to release the latter for return to said rest position, so as to open the shutter.

3. In a between-the-lens shutter assembly, in combination, a pair of co-axial rotary shutter ring means turnable together from a rest position to a cocked position while remaining relative to each other in a given angular position where the shutter is closed; a pair of spring means respectively cooperating with said pair of shutter ring means for urging the same to said rest position; releasable holding means cooperating automatically with one of said shutter ring means for retaining said one shutter ring means, in opposition to that one of said spring means which cooperates with said one shutter ring means, in said cocked position while the other of said shutter ring means is returned by the other spring means toward said rest position for opening the shutter; release means carried by said other shutter ring means for turning movement therewith, said release means engaging, during return of said other ring means to said rest position, said holding means and moving the latter away from said one shutter ring means for releasing the latter to said one spring means to be returned thereby to said rest position to close the shutter; adjustable timing means cooperating with said one shutter ring means for retarding the movement thereof by said one spring means to said rest position, so as to provide a selected exposure time, said one ring means having a portion which engages and actuates said timing means during return of said one ring means to said rest position; and manually operable means cooperating with both of said shutter ring means for moving the same from rest to said cocked position, said manually operable means cooperating with said other ring means to release the latter for return to said rest position, so as to open the shutter.

4. In a between-the-lens shutter assembly, in combination, a pair of co-axial rotary shutter ring means turnable together from a rest uposition to a cocked position while remaining relative to each other in a given angular position where the shutter is closed; a pair of spring means respectively cooperating with said pair of shutter ring means for urging the same to said rest position; releasable holding means cooperating automatically with one of said shutter ring means for retaining said one shutter ring means, in opposition to that one of said spring means which cooperates with said one shutter ring means, in said cocked position while the other of said shutter ring means is returned by the other spring means toward said rest position for opening the shutter; release means carried by said other shutter ring means for turning movement therewith, said release means engaging, during return of said other ring means to said rest position, said holding means and moving the latter away from said one shutter ring means for releasing the latter to said one spring means to be returned thereby to said rest position to close the shutter; adjustable timing means cooperating with said one shutter ring means for retarding the movement thereof by said one spring means to said rest position, so as to provide a selected exposure time, said one ring means having a portion which engages and actuates said timing means during return of said one ring means to said rest position; and manually operable means cooperating with both of said shutter ring means for moving the same from rest to said cocked position, said manually operable means cooperating with said other ring means to release the latter for return to said rest position, so as to open the shutter.

5. In a between-the-lens shutter assembly, in combination, a pair of co-axial rotary shutter ring means turnable together from a rest position to a cocked position while remaining relative to each other in a given angular position where the shutter is closed; a pair of spring means respectively cooperating with said pair of shutter ring means for urging the same to said rest position; releasable holding means cooperating automatically with one of said shutter ring means for retaining said one shutter ring means, in opposition to that one of said spring means which cooperates with said one shutter ring means, in said cocked position while the other of said shutter ring means is returned by the other spring means toward said rest position for opening the shutter; release means carried by said other shutter ring means for turning movement therewith, said release means engaging, during return of said other ring means to said rest position, said holding means and moving the latter away from said one shutter ring means for releasing the latter to said one spring means to be returned thereby to said rest position to close the shutter; adjustable timing means cooperating with said one shutter ring means for retarding the movement thereof by said one spring means to said rest position, so as to provide a selected exposure time; and manually operable means cooperating with both of said shutter ring means for moving the same from said rest to said cocked position, said manually operable means cooperating with said other ring means to release the latter for return to said rest position, so as to open the shutter, said manually operable means including a portion which engages a part of one of said ring means to move the pair of ring means from said rest to said cocked position, said portion of said manually operable means moving beyond said part to release said other ring means for return to said rest position while said one ring means is retained by said holding means in order to open the shutter.

6. In a between-the-lens shutter assembly, in combination, a pair of co-axial rotary shutter ring means turnable together from a rest position to a cocked position while remaining relative to each other in a given angular position where the shutter is closed; a pair of spring means respectively cooperating with said pair of shutter ring means for urging the same to said rest position; releasable holding means cooperating automatically with one of said shutter ring means for retaining said one shutter ring means, in opposition to that one of said spring means which cooperates with said one shutter ring means, in said cocked position while the other of said shutter ring means is returned by the other spring means toward said rest position for opening the shutter; release means carried by said other shutter ring means for turning movement therewith, said release means engaging, during return of said other ring means to said rest position, said holding means and moving the latter away from said one shutter ring means for releasing the latter to said one spring means to be returned thereby to said rest position to close the shutter; adjustable timing means cooperating with said one shutter ring means for retarding the movement thereof by said one spring means to said rest position, so as to provide a selected exposure time; and manually operable means cooperating with both of said shutter ring means for moving the same from said rest to said cocked position, said manually operable means cooperating with said other ring means to release the latter for return to said rest position, so as to open the shutter, said manually operable means including a cocking lever which cooperates with said pair of shutter ring means to turn the latter from said rest to said cocked position and said manually operable means also including a release lever which cooperates with said other ring means to retain the latter together with said one ring means in said cocked position until said release lever is actuated by the operator to release said other ring means to said other spring means to be moved by the latter to said rest position for opening the shutter.

7. In a between-the-lens shutter assembly, in combination, a pair of co-axial rotary shutter ring means turnable together from a rest position to a cocked position, while remaining relative to each other in a given angular position where the shutter is closed; a pair of spring means respectively cooperating with said pair of shutter ring means for urging the same to said rest position, one of said shutter ring means having a catch portion; a rotary holding lever cooperating with said catch portion of said one shutter ring means for releasably retaining the latter, in opposition to that one of said spring means which cooperates therewith, in said cocked position while the other of said ring means is returned by the other of said spring means toward said rest position for opening the shutter; a spring cooperating with said lever for urging the latter to the position where it cooperates with said catch portion for retaining said one shutter ring means in said cocked position; a projection carried by said other ring means for turning movement therewith, said lever being located in the path of turning movement of said projection when said lever engages said catch portion to retain said one shutter ring means in said cocked position, so that during return of said other ring means toward said rest position said projection engages said lever and turns the latter away from said one ring means for releasing the latter to said one spring means to be returned thereby to said rest position to close the shutter; adjustable timing means cooperating with said one ring means for retarding the movement thereof by said one spring means to said rest position, so as to provide a selected exposure time; and manually operable means cooperating with both of said ring means for moving the same from said rest to said cocked position, said manually operable means cooperating with said other shutter ring means to release the latter for return to said rest position so as open the shutter.

8. In a between-the-lens shutter assembly, in combination, a pair of co-axial rotary shutter ring means turnable together from a rest position to a cocked position, while remaining relative to each other in a given angular position where the shutter is closed; a pair of spring means respectively cooperating with said pair of shutter ring means for urging the same to said rest position, one of said shutter ring means having a catch portion; a rotary holding lever cooperating with said catch portion of said one shutter ring means for releasably retaining the latter, in opposition to that one of said spring means which cooperates therewith, in said cocked position while the other of said ring means is returned by the other of said spring means toward said rest position for opening the shutter; a spring cooperating with said lever for urging the latter to the position where it cooperates with said catch portion for retaining said one shutter ring means in said cocked position; a projection carried by said other ring means for turning movement therewith, said lever being located in the path of turning movement of said projection when said lever engages said catch portion to retain said one shutter ring means in said cocked position, so that during return of said other ring means toward said rest position said projection engages said lever and turns the latter away from said one ring means for releasing the latter to said one spring means to be returned thereby to said rest position to close the shutter; adjustable timing means cooperating with said one ring means for retarding the movement thereof by said one spring means to said rest position, so as to provide a selected exposure time, said lever forming part of said timing means.

9. In a between-the-lens shutter assembly, in combination, a pair of co-axial rotary shutter ring means turnable together from a rest position to a cocked position, while remaining relative to each other in a given angular position where the shutter is closed; a pair of spring means respectively cooperating with said pair of shutter ring means for urging the same to said rest position, one of said shutter ring means having a catch portion; a rotary holding lever cooperating with said catch portion of said one shutter ring means for releasably retaining the latter, in opposition to that one of said spring means which cooperates therewith, in said cocked position while the other of said ring means is returned by the other of said spring means toward said rest position for opening the shutter; a spring cooperating with said lever for urging the latter to the position where it cooperates with said catch portion for retaining said one shutter ring means in said cocked position; a projection carried by said other ring means for turning movement therewith, said lever being located in the path of turning movement of said projection when said lever engages said catch portion to retain said one shutter ring means in said cocked position, so that during return of said other ring means toward said rest position said projection engages said lever and turns the latter away from said one ring means for releasing the latter to said one spring means to be returned thereby to said rest position to close the shutter; adjustable timing means cooperating with said one ring means for retarding the movement thereof by said one spring means to said rest position, so as to provide a selected exposure time, said timing means including a rotary member having a projection and said one shutter ring means having a projection engaging said projection of said rotary member so that when said lever is moved away from said one shutter ring means said one spring means acts on said one shutter ring means to turn the latter and said projection therewith for turning said rotary member to actuate the timing means; and manually operable means cooperating with both of said ring means for moving the same from said rest to said cocked position, said manually operable means cooperating with said other shutter ring means to release the latter for return to said rest position so as to open the shutter.

10. In a between-the-lens shutter assembly, in combination, a pair of co-axial rotary shutter ring means turnable together from a rest position to a cocked position while remaining relative to each other in a given angular position where the shutter is closed; a pair of spring means respectively cooperating wtih said pair of shutter ring means for urging the same to said rest position; releasable holding means cooperating automatically with one of said shutter ring means for retaining said one shutter ring means, in opposition to that one of said spring means which cooperates with said one shutter ring means, in said cocked position while the other of said shutter ring means is returned by the other spring means toward said rest position for opening the shutter; release means carried by said other shutter ring means for turning movement therewith, said release means engaging, during return of said other ring means to said rest position, said holding means and moving the latter away from said one shutter ring means for releasing the latter to said one spring means to be returned thereby to said rest position to close the shutter; adjustable timing means cooperating with said one shutter ring means for retarding the movement thereof by said one spring means to said rest position, so as to provide a selected exposure time; and manually operable means cooperating with both of said shutter ring means for moving the same from said rest to said cocked position, said manually operable means cooperating with said other ring means to release the latter for return to said rest position, so as to open the shutter, said manually operable means including a manually turnable member, a lever turnably carried by said member and engaging a part of said rings to turn both of said rings from said rest to said cocked position during turning of said member in one direction, said part tending to turn said lever in a given direction with respect to said member, a stop carried by said member and limiting the turning of said lever with respect thereto in said one direction, and spring means cooperating wtih said lever for urging the same against said stop, said lever moving beyond said part to release said other ring means for return to said rest position.

References Cited in the file of this patent
UNITED STATES PATENTS

| | | |
|---|---|---|
| 2,423,706 | Hutchinson | July 8, 1947 |
| 2,718,834 | Fuerst | Sept. 27, 1955 |
| 2,890,640 | Noack | June 16, 1959 |

UNITED STATES PATENT OFFICE
CERTIFICATE OF CORRECTION

Patent No. 3,069,989                                            December 25, 1962

Gerd Kiper

It is hereby certified that error appears in the above numbered patent requiring correction and that the said Letters Patent should read as corrected below.

Column 9, line 5, for "close" read -- closed --; line 11, strike out "means,".

Signed and sealed this 1st day of October 1963.

(SEAL)
Attest:

ERNEST W. SWIDER

Attesting Officer

DAVID L. LADD

Commissioner of Patents